March 16, 1971 W. J. HOLM 3,570,080
CLOTH SHEARING MACHINE WITH AUTOMATIC TENSION CONTROL
Filed Jan. 23, 1969
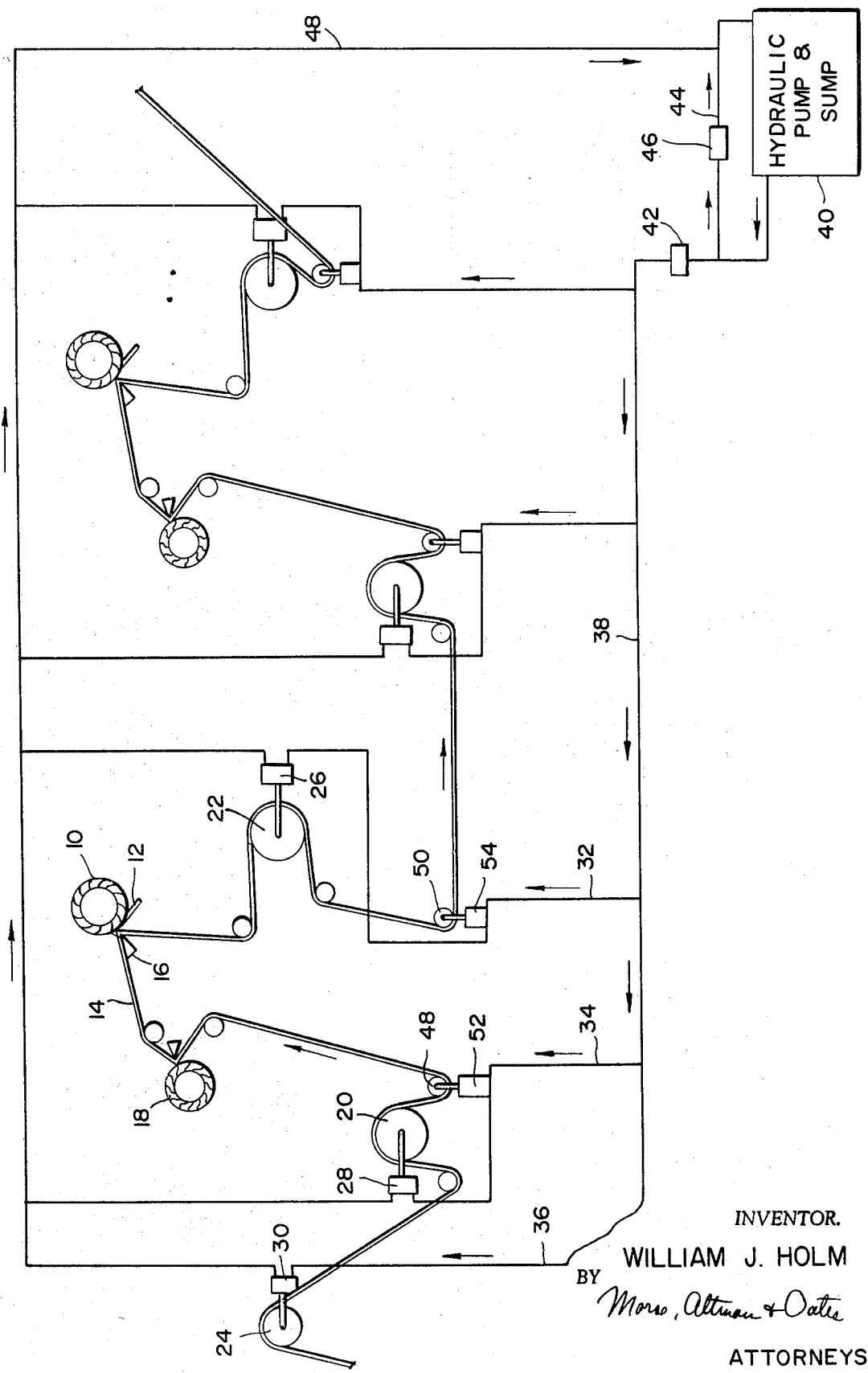
INVENTOR.
WILLIAM J. HOLM
BY Morse, Altman & Oates
ATTORNEYS

United States Patent Office 3,570,080
Patented Mar. 16, 1971

3,570,080
CLOTH SHEARING MACHINE WITH AUTOMATIC TENSION CONTROL
William J. Holm, Springfield, Vt., assignor to Riggs & Lombard, Inc., Lowell, Mass.
Filed Jan. 23, 1969, Ser. No. 793,400
Int. Cl. D06c *13/00*
U.S. Cl. 26—15                                                      1 Claim

ABSTRACT OF THE DISCLOSURE

A cloth shearing machine is provided with a self-compensating tension control system to maintain a constant and uniform tension on a runnig cloth web as it passes through the machine. The speed of independently driven draft rolls is responsive to the movement of an associated sensing roll which engages the web and moves upon changes in tension of the web. Each sensing roller is operatively connected to a draft roll to control its speed of operation.

BACKGROUND OF THE INVENTION

(1) Field of the invention

This invention relates generally to cloth shearing machines and more particularly is directed towards a cloth shearing machine provided with a system for maintaining tension on a cloth web passing through the machine.

(2) History of the prior art

Cloth shearing machines customarily employ a rotary, cylindrical, reel-like member having a number of helical shearing blades which co-act with a stationary ledger knife to shear to a uniform level fibers protruding from the surface of a cloth web passed close to the rotary member. In practice, the cloth is fed rapidly through the machine, past the shearing devices in flat and open relation with the cloth being supported in proximity to the co-acting blades by means of a rest which supports the cloth at the shearing line.

Heretofore, cloth shearing machines usually have been driven by a single power source, such as an electric motor, with the various draft rolls geared together. Such drive systems permit no variation in the relative speed of operation of the various draft rolls and, as a result, maintenance of a uniform tension on the web throughout the cloth shearing machine has been difficult. It is desirable to maintain uniform tension on the web that is being shorn to insure that the web is held tightly against the rest as it passes in proximity to the shearing elements. Changes in tension at this point can produce uneven shearing results. Such changes in tension may appear, for example, as a result of imperfect weaving of the cloth, causing certain portions to stretch under tension and cannot be corrected in a system where all of the draft rolls operate at the same speed.

Accordingly, it is an object of the present invention to provide a cloth shearing machine having a drive system adapted to maintain uniform tension on a running cloth web regardless of changes in the characteristics of the web. Another object of this invention is to provide a self-compensating tension control system for a cloth shearing machine.

SUMMARY OF THE INVENTION

This invention features a cloth shearing machine having a drive system comprised of independently driven draft rolls feeding a web into shearing engagement with co-operating shearing elements. A sensing roller engages the web in proximity to each draft roll and is movable in response to changes in web tension. The sensing roller controls the speed of operation of the draft roll speeding it up or slowing it down as required to maintain uniform tension of the web.

DESCRIPTION OF THE DRAWING

The figure is a schematic diagram of a cloth shearing machine having a tension control system made according to the invention.

DETAILED DESCRIPTION OF THE PREFERRED EMBODIMENT

The shearing machine is generally organized about cloth shearing elements comprised of a power driven reel-like rotary cutter 10 having a plurality of helical blades 11 and a fixed ledger knife 12 mounted in cutting relationship therewith. A cloth web 14 is carried into shearing relationship with the cutter 10 and knife 12 by being passed over a fixed rest 16, generally triangular in cross-section, whereby the web 14 will move in open width form past the shearing elements with the fibers thereof being raised along the shearing line at the apex of the rest. In order to prepare the fibers for optimum presentation to the shearing elements, a rotary brush 18 customarily is employed in advance of the shearing elements in order to raise the nap of the web. In the illustrated embodiment a two-stage shearing apparatus is disclosed, each stage being comprised of a shearing revolver, a ledger knife, rest and brush. It will be understood that the invention will be applicable not only to the two-stage apparatus shown but also to a shearing apparatus having a single stage or more than two stages.

The web 14 is fed through the first stage of the cloth shearing machine by means of a pair of independently driven draft rolls 20 and 22, the draft roll 20 being located at the feed side of the first stage of the shearing machine and draft roll 22 being located on the output side of the first stage. Subsequent stages duplicate the first stage. Another independently driven draft roll 24 is employed at the feed end of the entire machine and is operated at a constant speed whereas the other draft rolls operate at variable speeds.

The draft rolls 20, 22 and 24, as well as those in other stages, are driven, in the illustrated embodiment, by means of associated hydraulic motors 26, 28 and 30, respectively, connected by branch conduits 32, 34, and 36, respectively, to a main conduit 38 which in turn is connected to a hydraulic pump 40 shown in box form and equipped with the usual sump. Associated with the hydraulic pump 40 is a flow control valve 42 which is manually adjustable to control the maximum speed of operation of the draft rolls. A by-pass line 44 is also provided and is equipped with a safety valve 46. A return line 48 is connected to the various branch conduits and delivers the hydraulic fluid back to the pump 40.

Mounted in close proximity to each of the draft rolls 20 and 22, is a tension sensing roll 48 and 50, respectively. The web 14 passes about each of the sensing rollers each of which is operatively connected to an individual flow regulator 52 and 54, respectively. The flow regulator 52 is connected in the branch conduit 34 while the flow regulator 54 is connected in the branch conduit 32, each being adapted to control the flow of hydraulic fluid to its associated hydraulic motor 26 and 28, thereby controlling the speed of the associated draft rolls 20 and 22. The sensing rolls 48 and 50 are mounted for limited movement so that as the tension on the web increases or decreases the associated regulator will be opened or closed accordingly to speed up or slow down the draft rolls associated with the sensing rolls. In this fashion the tension on the web remains substantially uniform and constant throughout the machine regardless of any variation in the characteristics of the web and the system will be self-regulating.

While the invention has been described in connection with a hydraulic draft system, similar results may be obtained by individual pneumatic motors, each controlled by an air regulator connected to the sensing roller.

When an air system is employed waste air may be released to the atmosphere and there would be no need of return lines from the motors to the pneumatic pump.

Having thus described the invention what I claim and desire to obtain by Letters Patent of the United States is:

1. A machine for shearing a running cloth web, comprising:
   (a) a rotary shearing member adapted to shear fibers projecting from the face of said web,
   (b) guide means for delivering said web into shearing relation with said member,
   (c) a draft roll at the feed and discharge sides of said shearing member for feeding said web through said machine,
   (d) an individual variable speed fluid driven motor drivingly connected to each of said draft rolls,
   (e) a fluid power source common to both of said motors,
   (f) conduit means connecting said source to each of said motors for delivering fluid pressure thereto,
   (g) a roller associated with each of said rolls, engaging said web and movable in response to changes in web tension to sense the tension thereof,
   (h) control means including a regulating valve connected to said tension sensing member and said conduit means for regulating power to both of said motors according to the tension on said web.

References Cited

UNITED STATES PATENTS 1,049,248  12/1912  Marble _____ 26—15

FOREIGN PATENTS 1,041,317  10/1958  Germany _____ 226—42
1,098,483  2/1961   Germany _____ 26—15

ROBERT R. MACKEY, Primary Examiner

U.S. Cl. X.R.

226—42, 44